(12) United States Patent
Thompson et al.

(10) Patent No.: US 10,041,639 B1
(45) Date of Patent: Aug. 7, 2018

(54) SMART NIGHTLIGHT

(71) Applicant: 1842728 Ontario Inc, Barrie (CA)

(72) Inventors: Mitch Thompson, Barrie (CA); David Snaith, Toronto (CA); Daniel Kowalewski, Woodbridge (CA); Steve A. Copeland, Barrie (CA)

(73) Assignee: 1842728 Ontario Inc, Barrie, Ontario (CA)

( * ) Notice: Subject to any disclaimer, the term of this patent is extended or adjusted under 35 U.S.C. 154(b) by 0 days.

(21) Appl. No.: 15/485,313

(22) Filed: Apr. 12, 2017

(51) Int. Cl.
| | |
|---|---|
| *H05B 37/02* | (2006.01) |
| *H05B 33/08* | (2006.01) |
| *F21V 23/04* | (2006.01) |
| *F21V 25/02* | (2006.01) |
| *F21S 8/00* | (2006.01) |
| *F21V 23/06* | (2006.01) |
| *F21S 9/02* | (2006.01) |
| *F21V 5/04* | (2006.01) |
| *F21V 23/02* | (2006.01) |
| *F21Y 115/10* | (2016.01) |
| *F21Y 113/13* | (2016.01) |

(52) U.S. Cl.
CPC .............. *F21S 8/035* (2013.01); *F21S 8/00* (2013.01); *F21S 9/02* (2013.01); *F21V 5/045* (2013.01); *F21V 23/02* (2013.01); *F21V 23/04* (2013.01); *F21V 23/06* (2013.01); *F21V 25/02* (2013.01); *H05B 33/0845* (2013.01); *H05B 33/0863* (2013.01); *H05B 37/0272* (2013.01); *H05B 37/0281* (2013.01); *F21Y 2113/13* (2016.08); *F21Y 2115/10* (2016.08)

(58) Field of Classification Search
CPC .......... F21V 14/02; F21V 21/08; F21V 21/14; F21V 21/30; F21V 23/0492; F21V 23/0442; F21V 23/0471; F21V 5/045; H05B 37/02; H05B 33/0803; H05B 33/0824; H05B 33/0845; H05B 33/0863; H05B 37/0272; H05B 37/0281; H04N 5/2252; H04N 5/2256; Y02T 10/7005; Y02T 90/162; F21S 8/035; F21S 9/02; F21Y 2113/13; F21Y 2115/10
See application file for complete search history.

(56) References Cited

U.S. PATENT DOCUMENTS

| | | |
|---|---|---|
| D352,564 S | 11/1994 | Marischen |
| D375,808 S | 11/1996 | Fang |
| D376,436 S | 12/1996 | Emmerling |
| D377,535 S | 1/1997 | Shulman |
| 5,662,408 A | 9/1997 | Marischen |
| D392,756 S | 3/1998 | Hanig et al. |
| D393,733 S | 4/1998 | Gaskins et al. |
| D403,442 S | 12/1998 | Joss |
| D426,657 S | 6/2000 | Joss |
| D435,124 S | 12/2000 | Yuen |

(Continued)

*Primary Examiner* — Vibol Tan
(74) *Attorney, Agent, or Firm* — Sand & Sebolt

(57) ABSTRACT

A night light includes a housing, a dimmable light source operatively connected to a rotatable light source controller rotatable about an axis and at least one first sensor mounted within the housing operative to sense rotation of the rotatable light source. The at least one first sensor outputs a signal representative of the rotation. Further, the rotatable light source can be rotated by a hand of a user. Still further, the light night can be controlled via wireless communication.

20 Claims, 8 Drawing Sheets

(56) References Cited

U.S. PATENT DOCUMENTS

| | | | |
|---|---|---|---|
| 6,894,343 B2 * | 5/2005 | Harari | H01L 27/115 257/314 |
| D533,956 S | 12/2006 | Vladika | |
| D544,618 S | 6/2007 | Coushaine | |
| D556,938 S | 12/2007 | Russello et al. | |
| 7,303,327 B2 * | 12/2007 | Copeland | F21S 8/035 362/271 |
| D562,492 S | 2/2008 | Chen | |
| D574,095 S | 7/2008 | Hill et al. | |
| D606,185 S | 12/2009 | Wefler et al. | |
| D628,722 S | 12/2010 | Yamamoto et al. | |
| D634,055 S | 3/2011 | Hokazono et al. | |
| D647,227 S | 10/2011 | Kaule et al. | |
| D736,449 S | 8/2015 | Getty | |
| D741,539 S | 10/2015 | Gettings et al. | |
| D771,860 S | 11/2016 | Weiss et al. | |
| D777,367 S | 1/2017 | Ma | |
| D779,977 S | 2/2017 | Jacob et al. | |
| 9,568,171 B1 | 2/2017 | Grider et al. | |
| 9,633,557 B2 * | 4/2017 | Dimberg | G08C 17/02 |
| D794,765 S | 8/2017 | Brandenburg et al. | |
| 9,759,421 B1 * | 9/2017 | Baschnagel | F21V 33/0048 |
| 2002/0014960 A1 | 2/2002 | Williams, Jr. | |
| 2003/0193795 A1 | 10/2003 | Brown | |
| 2004/0145890 A1 | 7/2004 | Liao | |
| 2007/0253192 A1 | 11/2007 | Monteiro et al. | |
| 2012/0009807 A1 * | 1/2012 | Kuo | H01R 24/30 439/131 |
| 2014/0016331 A1 | 1/2014 | Ting | |
| 2014/0316581 A1 * | 10/2014 | Fadell | F24F 11/0009 700/276 |
| 2015/0371534 A1 * | 12/2015 | Dimberg | G08C 17/02 340/12.5 |
| 2016/0025316 A1 | 1/2016 | Chien | |
| 2016/0173746 A1 * | 6/2016 | Chien | F21V 33/0052 348/159 |
| 2016/0181726 A1 * | 6/2016 | Zhang | H01R 24/30 439/131 |
| 2016/0313636 A1 * | 10/2016 | Chien | G03B 29/00 |
| 2017/0193814 A1 * | 7/2017 | Dimberg | G08C 17/02 |
| 2017/0205058 A1 | 7/2017 | Ostrander | |

* cited by examiner

SMART NIGHTLIGHT

BACKGROUND OF THE INVENTION

Technical Field

The present disclosure relates generally to the field of lighting devices. More particularly, the present disclosure relates to a smart night light. Specifically, the present disclosure relates to a smart, dimmable, portable and rechargeable night light.

Background Information

Typically, a night light is a small electrical light fixture used to provide light in various places. For example, night lights are typically used in hallways, bedrooms or other dark areas for illumination purposes or to provide a sense of security. Typically, night lights are available in a wide variety of styles, however, some night lights are constructed with cheap materials, have a lackluster aesthetics and minimal or limited functionality.

SUMMARY

A need continues to exist to improve the construction of night lights, improve the aesthetics of night lights and improve the functionality of night lights. The present disclosure addresses these and other issues.

In one aspect, the disclosure may provide a night light comprising a housing, a dimmable light source operatively connected to a rotatable light source controller rotatable about an axis and at least one first sensor mounted within the housing operative to sense rotation of the rotatable light source. The at least one first sensor outputs a signal representative of the rotation. Further, the rotatable light source can be rotated by a hand of a user.

In another aspect, the disclosure may provide a method of controlling a night light comprising downloading an application associated with a night light having a dimmable light source and connecting a wireless device to the night light. The method further provides selecting a color of the dimmable light source, selecting a light intensity level of the dimmable light source, selecting a timer control function of the dimmable light source and selecting a motion activated control function.

In accordance with one aspect, an embodiment of the present disclosure may provide a method comprising: providing a dimmable light source circumscribed by an annular controller in operative communication with the dimmable light source; rotating the annular controller in a first direction to increase the light source intensity; and rotating the annular controller in an opposing second direction to decrease the light source intensity, wherein the light source is interior to the annular controller during rotation thereof in both the first direction and the second direction.

In another aspect, the disclosure may provide a night light which includes a housing, a dimmable light source operatively connected to a rotatable light source controller rotatable about an axis and at least one first sensor mounted within the housing operative to sense rotation of the rotatable light source. The at least one first sensor outputs a signal representative of the rotation. Further, the rotatable light source can be rotated by a hand of a user. Still further, the light night can be controlled via wireless communication.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
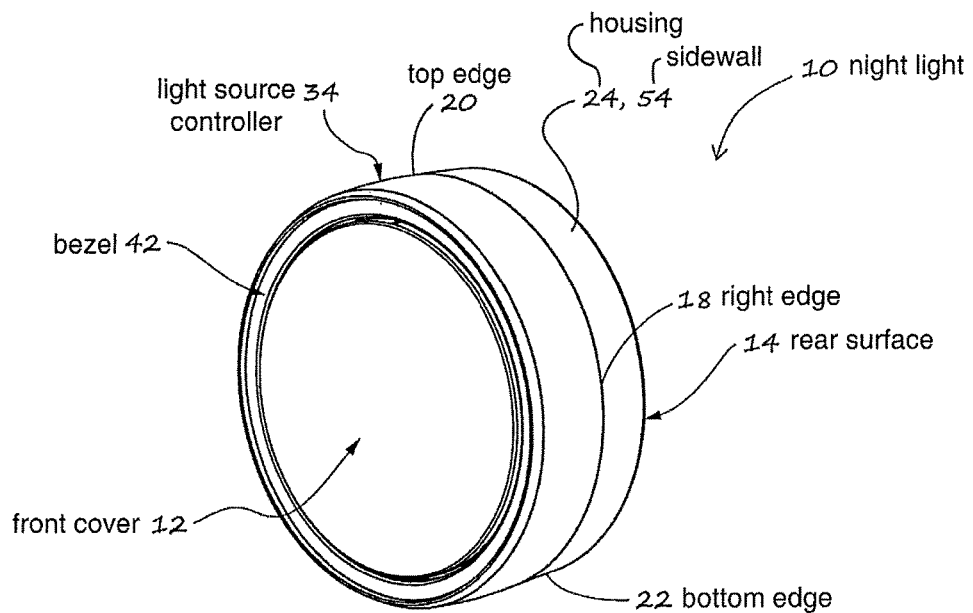
FIG. 1 is a front isometric view of a night light in accordance with the present disclosure.
Figure 2:
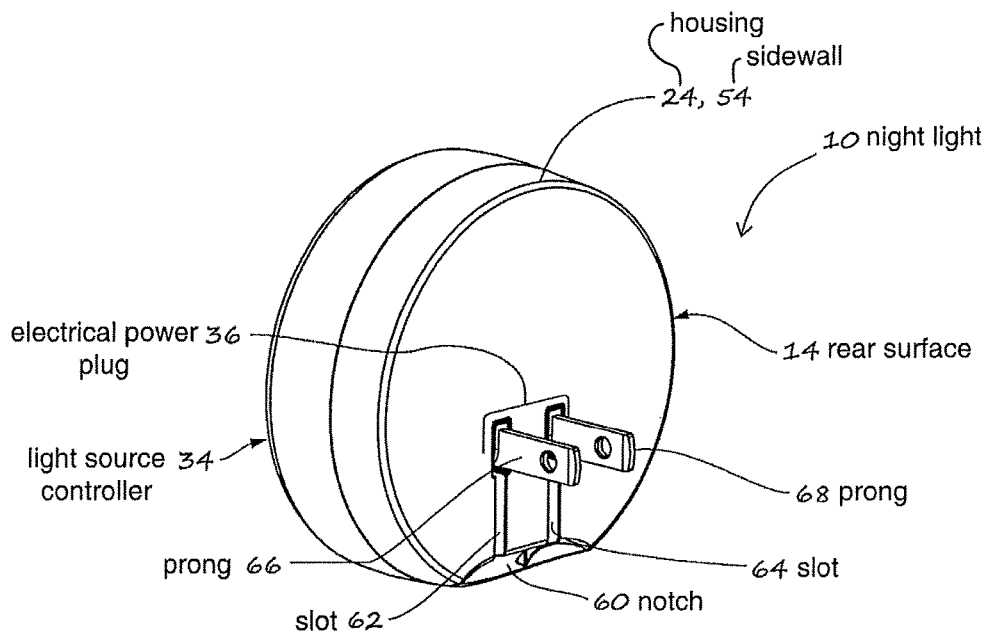
FIG. 2 is a rear isometric view of the night light in accordance with the present disclosure.

In accordance with one aspect of the present disclosure, a night light 10 includes a front cover 12, a rear surface 14, a left edge 16, a right edge 18, a top edge 20, a bottom edge 22, a housing 24, a dimmable light source 26, at least one first sensor 28, such as an optical encoder used in conjunction with an encoder strip 30, at least one second sensor 32 such as a passive infrared sensor, a light source controller 34 such as a rotatable annular ring or an annular controller, a retractable electrical power plug 36, a battery source 38, a processor logic 40 and a bezel 42.

As depicted in FIGS. 1-9, and in accordance with one aspect of the present disclosure, the night light 10 is generally cylindrical in shape and may have a visually pleasing outer appearance. Although the night light 10 is depicted as being cylindrical in shape, the night light 10 may be any shape such as trapezoidal, square or any other suitable shape.

When viewed from the left, the front cover 12 and the rear surface 14 of the night light 10 define a longitudinal direction therebetween. The night light 10 includes a longitudinal axis X1 extending longitudinally through the center of the night light 10. When viewed from the front, the left edge 16 and the right edge 18 of the night light 10 define a transverse direction therebetween. The night light 10 includes a transverse axis X2 extending transversely through the center of the night light 10. When viewed from the front, the top edge 20 and the bottom edge 22 of the night light 10 define a vertical direction therebetween. The night light 10 includes a vertical axis X3 extending vertically through the center of the night light 10.

Figure 3:
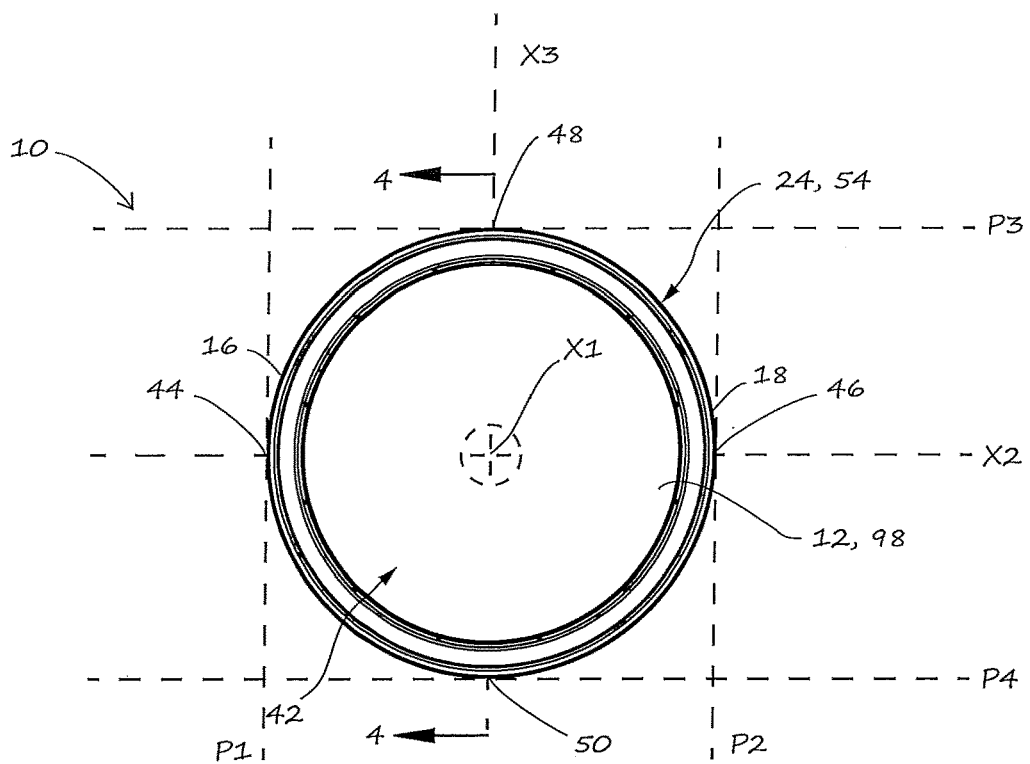
FIG. 3 is a front elevation view of the night light in accordance with the present disclosure.
Figure 4:
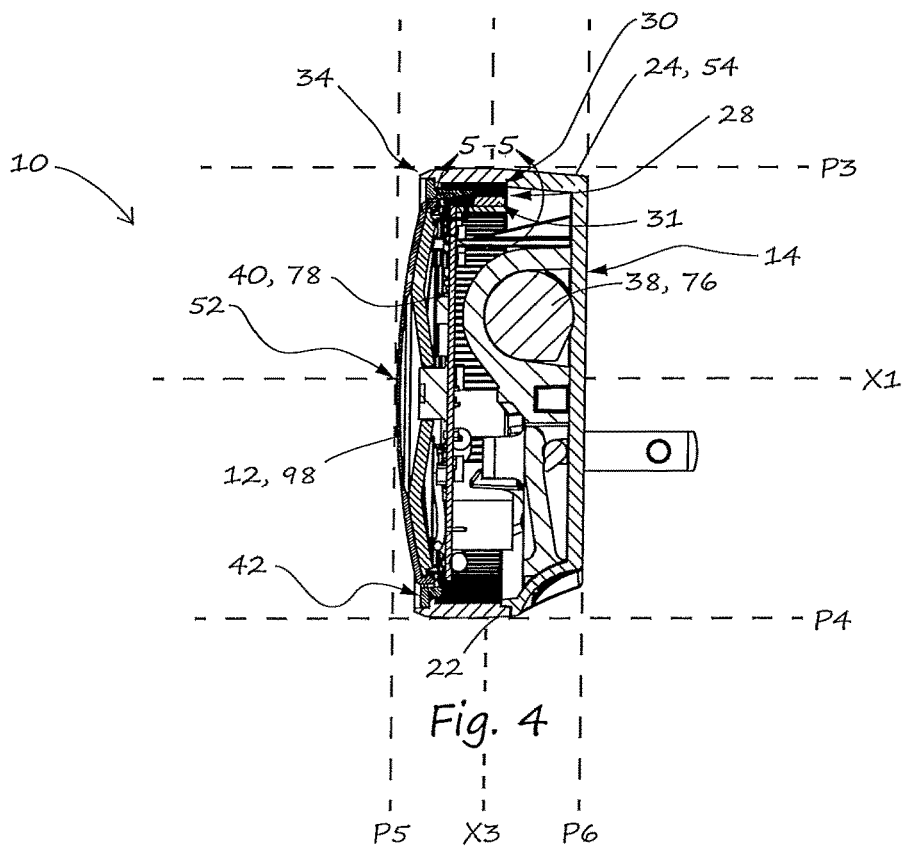
FIG. 4 is a right side section view of the night light in accordance with the present disclosure taken along line 4-4 in FIG. 3.
Figure 5:
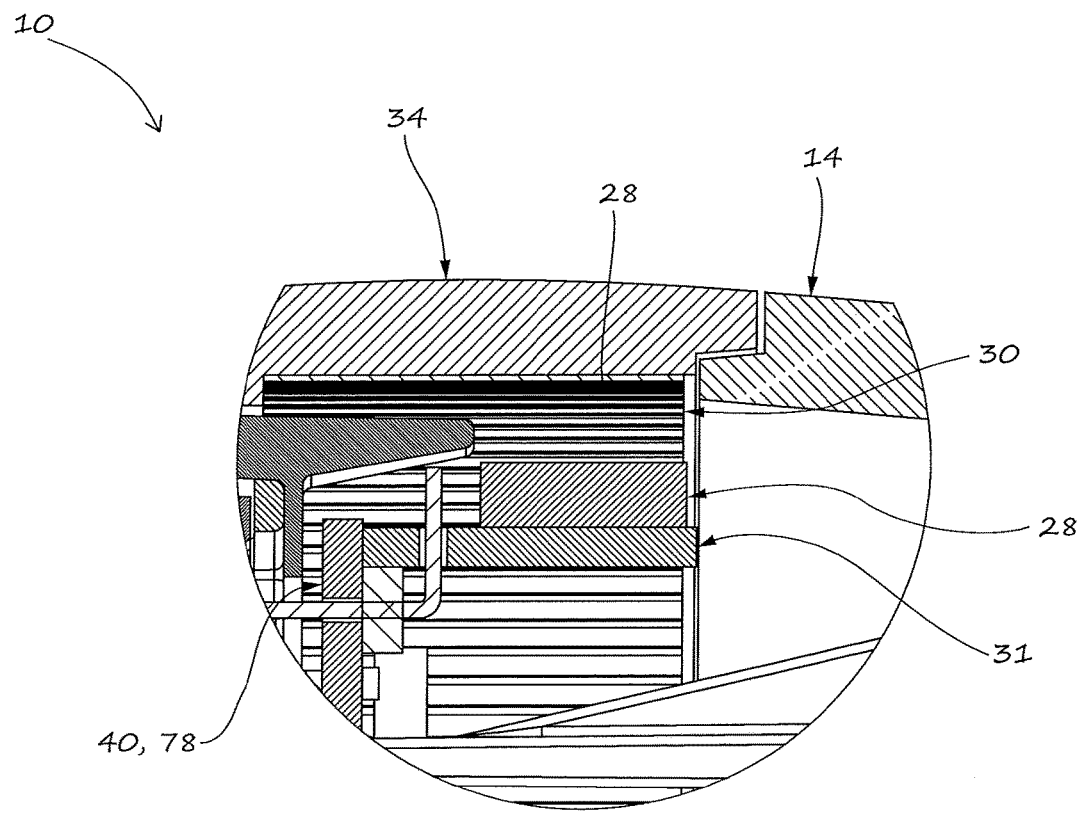
FIG. 5 is an enlarged partial view of the right side section view of the night light in accordance with the present disclosure taken along line 5-5 in FIG. 4.
Figure 6:
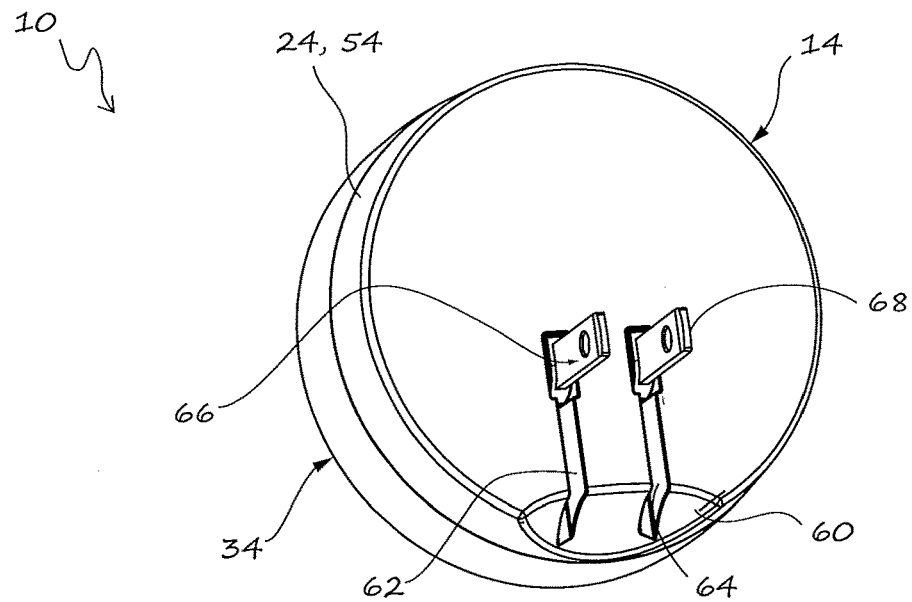
FIG. 6 is a rear isometric view of the night light in accordance with the present disclosure.
Figure 7:
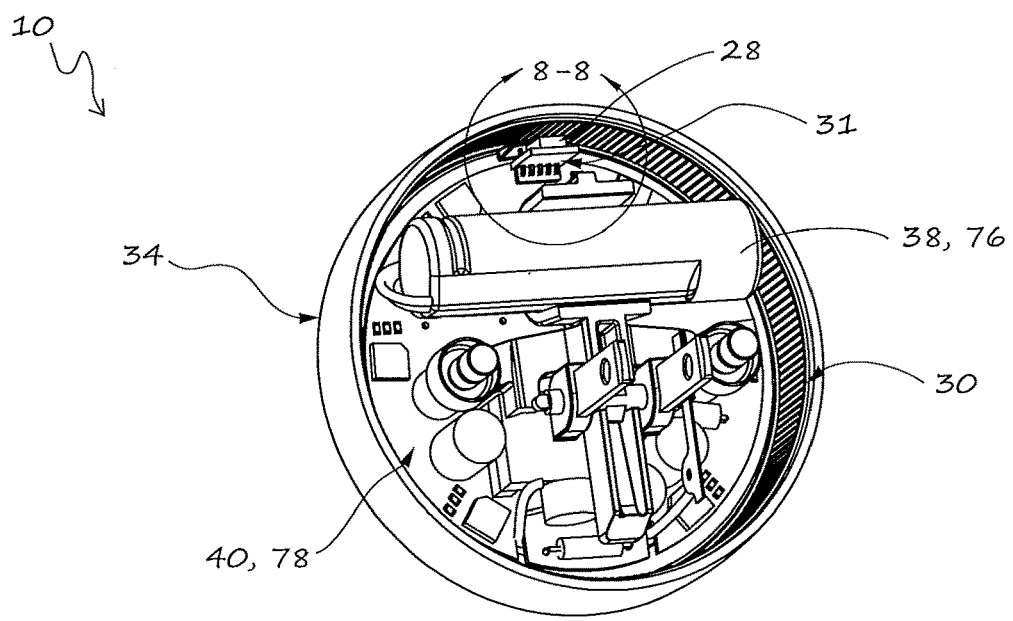
FIG. 7 is a rear isometric view of the night light in accordance with the present disclosure with the rear surface removed.
Figure 8:
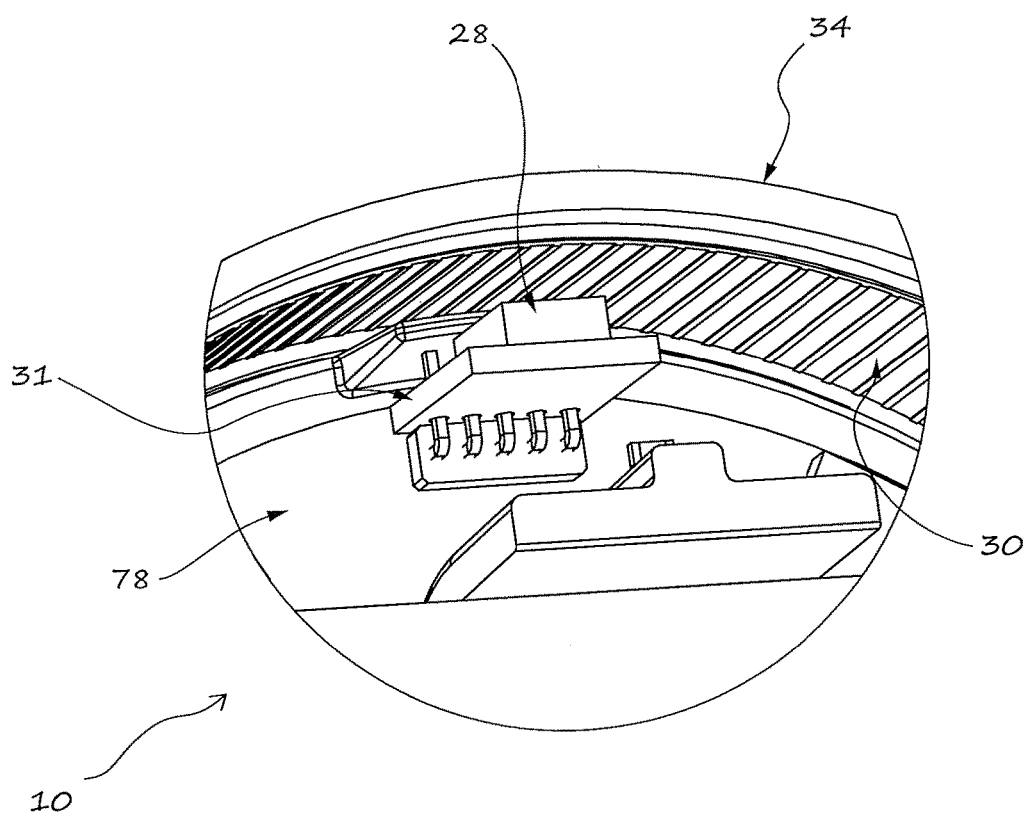
FIG. 8 is an enlarged partial view of the rear isometric view of the night light in accordance with the present disclosure taken along line 8-8 in FIG. 7.
Figure 9:
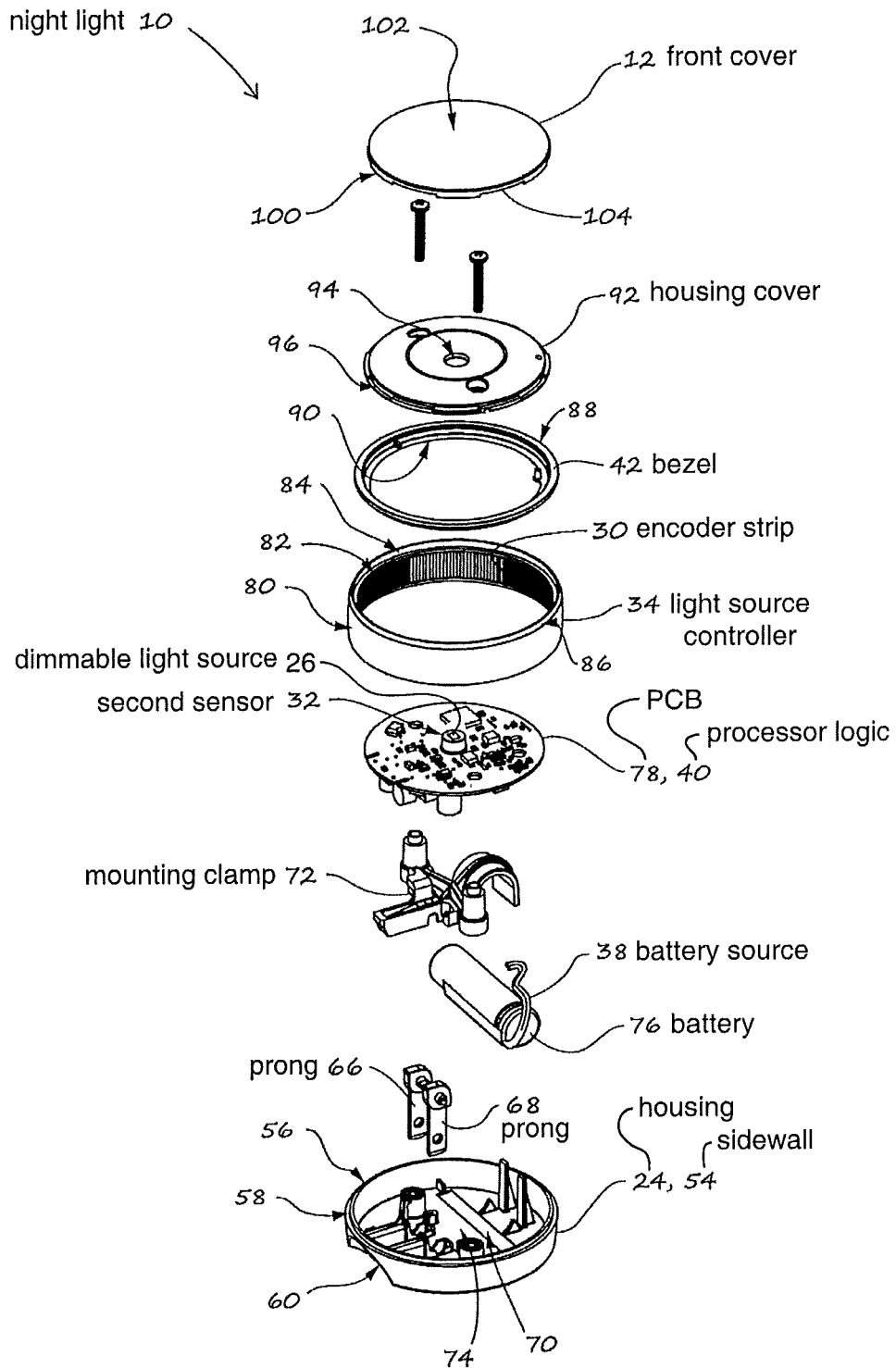
FIG. 9 is an exploded isometric view of the night light in accordance with the present disclosure.

As depicted in FIGS. 3-4, and in accordance with the present disclosure, when viewed from the front, the night light 10 further includes an imaginary first tangential plane P1 perpendicular to the transverse axis X2 defined by a tangent to a leftmost point 44 on the left edge 16. When viewed from the front, the night light 10 further includes an imaginary second tangential plane P2 perpendicular to the transverse axis X2 defined by a tangent to a rightmost point 46 on the right edge 18.

When viewed from the front, the night light 10 further includes an imaginary third tangential plane P3 perpendicular to the vertical axis X3 defined by a tangent to a topmost point 48 on the top edge 20. When viewed from the front, the night light 10 further includes an imaginary fourth tangential plane P4 perpendicular to the vertical axis X3 defined by a tangent to a bottommost point 50 on the bottom edge 22. As depicted in FIG. 4, when viewed from the left, the night light 10 further includes an imaginary fifth tangential plane P5 perpendicular to the longitudinal axis X1 defined by a tangent to a frontmost point 52 on the front cover 12. When viewed from the left, the night light 10 further includes an imaginary rear surface plane P6 perpendicular to the longitudinal axis X1 defined by the rear surface 14.

As depicted in FIGS. 3-4, and in accordance with the present disclosure, the imaginary first tangential plane P1 is parallel to the imaginary second tangential plane P2. The imaginary first tangential plane P1 and the imaginary second tangential plane P2 are perpendicular to the imaginary third tangential plane P3, the imaginary fourth tangential plane P4, the imaginary fifth tangential plane P5 and the rear surface plane P6.

The imaginary third tangential plane P3 is parallel to the imaginary fourth tangential plane P4. The imaginary third tangential plane P3 and imaginary fourth tangential plane P4 are perpendicular to the imaginary first tangential plane P1, the imaginary second tangential plane P2, the imaginary fifth tangential plane P5 and the rear surface plane P6.

The imaginary fifth tangential plane P5 is parallel to the rear surface plane P6. The imaginary fifth tangential plane P5 and rear surface plane P6 are perpendicular to the imaginary first tangential plane P1, the imaginary second tangential plane P2, the imaginary third tangential plane P3 and the imaginary fourth tangential plane P4.

As depicted in FIGS. 3-4, and in accordance with the present disclosure, the longitudinal axis X1 is intermediate the imaginary first tangential plane P1 and the imaginary second tangential plane P2. The longitudinal axis X1 is intermediate the imaginary third tangential plane P3 and the imaginary fourth tangential plane P4.

As depicted in FIGS. 3-4, and in accordance with the present disclosure, the transverse axis X2 is intermediate the imaginary third tangential plane 3 and the imaginary fourth tangential plane P4. The transverse axis X2 is intermediate the imaginary fifth tangential plane P5 and the rear surface plane P6.

As depicted in FIGS. 3-4, and in accordance with the present disclosure, the vertical axis X3 is intermediate the imaginary first tangential plane P1 and the imaginary second tangential plane P2. The vertical axis X3 is intermediate the imaginary fifth tangential plane P5 and the rear surface plane P6.

In accordance with one aspect of the disclosure, the housing 24 includes a generally cylindrical sidewall 54 extending longitudinally from the generally planar rear surface 14 of the night light 10 towards the front cover 12 into a generally circular free end 56 having a rim 58. Further, in accordance with the present disclosure, the housing 24 is made of a translucent acrylic/styrene material, although other suitable materials may be used as one of ordinary skill in the art would understand. Since the housing is translucent, when the night light 10 is powered on and the dimmable light source 26 is illuminated, light illuminates out of the housing 24 in all directions.

In accordance with one aspect of the disclosure, the generally cylindrical sidewall 54 further defines an arcuate notch 60 located below the longitudinal axis X1 and between the imaginary first tangential plane P1 and the imaginary second tangential plane P2. The generally cylindrical sidewall 54 further defines a pair of parallel slots 62, 64 formed in the arcuate notch 60 and the rear surface 14 extending from partially within the arcuate notch 60 in a vertically upward direction towards the transverse axis X2.

In one aspect according to the present disclosure, the pair of slots 62, 64 is located below the transverse axis X2 and between the imaginary first tangential plane P1 and the imaginary second tangential plane P2. When viewed from the front, one slot 62 is located to the left of the vertical axis X3 and the other slot 64 is located to the right of the vertical axis X3. Although particular locations of the arcuate notch 60 and pair of slots 62, 64 have been described, other suitable configurations may be utilized as one of ordinary skill in the art would understand.

In accordance with one aspect of the present disclosure, the retractable electrical power plug 36 of the night light 10 includes at least two prongs 66, 68 adapted to be pivotal and utilized with conventional alternating current (AC) electrical outlets as described further below. The retractable electrical power plug 36 may be adapted for the at least two prongs 66, 68 to be pivotal from a retracted position to an extended position.

When the at least two prongs 66, 68 are in the retracted position, the at least two prongs 66, 68 are disposed within the pair of slots 62, 64. When the at least two prongs 66, 68 pivot into the extended position, the at least two prongs 66, 68 may be inserted into a conventional (AC) electrical outlet (not shown). When the at least two prongs 66, 68 are removed from the electrical outlet, the at least two prongs 66, 68 may pivot back to the retracted position. Therefore, the night light 10 may be powered by the AC electrical outlet by plugging the retractable electrical power plug 36 into the AC electrical outlet. The night light 10 may also be powered by a battery source 38 as further described below.

The placement of the arcuate notch 60 and pair of slots 62, 64 as described above is advantageous in that the at least two prongs 62, 64 are easily accessible by a hand of a user of the night light 10. Easy access allows convenient manipulation of the at least two prongs 66, 68 into the retracted and the extended position. Further, the hand of the user of the night light 10 may utilize the arcuate notch 60 as a convenient contact point when inserting and removing the night light 10 from the electrical outlet. Another advantage of the retractable electrical power plug 36 is that when the at least two prongs 66, 68 are in the retracted position, the at least two prongs 66, 68 do not extend into the rear surface plane P6 and thus the night light 10 will lie flush with a surface (not shown) when the night light 10 is set on its rear surface 14.

In accordance with one aspect of the disclosure, the generally cylindrical sidewall 54 further defines an internal cavity 70 within the housing 24. In one aspect according to the present disclosure, the battery source 38 is mounted within the internal cavity 70 of the housing 24 utilizing any suitable method of mounting. For example, and not meant to be limiting, the battery source 38 may be mounted within the internal cavity 70 fastening a mounting clamp 72, or any other suitable mounting device, an inner surface 74 of the internal cavity 70 with fastening devices such as screws or the like. In one aspect according to the present disclosure, the battery assembly may be mounted vertically upward from the longitudinal axis X1 and between the imaginary first tangential plane P1 and the imaginary second tangential plane P2.

In one aspect according to the present disclosure, the battery source 38 may utilize a lithium iron phosphate (LiFePO4) battery (LFP battery) 76 which is a type of rechargeable battery. Other suitable batteries may be used as one of ordinary skill in the art would understand. When the retractable electrical power plug 36 is inserted into the AC electrical outlet, AC current flowing from the AC electrical outlet through the retractable electrical power plug 36 and charges the battery 76 within the battery source 38.

Thus, when the night light 10 is removed from the electrical outlet, the night light 10 is powered by the battery 76. In one aspect according to the present disclosure, when the battery 76 is fully charged, the battery 76 may serve as a power source of the night light 10 for up to eight hours. Therefore, not only can the night light 10 serve as a source of illumination in the particular location where the night light 10 is plugged into the electrical outlet, but the night light 10 may serve as a source of illumination in any desired location when the night light 10 is powered by the battery 76 for as long as the battery 76 keeps a sufficient charge. Therefore, in one aspect according to the present disclosure, the night light 10 is portable and rechargeable. Further, it is envisioned that the night light 10 may be adapted to be powered by a universal serial bus or any other suitable power source as one of ordinary skill in the art would understand.

In accordance with one aspect of the disclosure, the night light 10 further includes at least one printed circuit board (PCB) 78 which mechanically supports and electrically connects various electronic components as further described below. In one aspect according to the present disclosure, the PCB 78 is generally planar and mounted within the internal cavity 70 of the housing 24 utilizing any suitable method of mounting. For example, and not meant to be limiting, the PCB 78 may be mounted within the internal cavity 70 and be rigidly connected to the mounting clamp 72 with fastening devices such as screws or the like while the mounting clamp 72 being fastened to the inner surface 74. In one aspect according to the present disclosure, the PCB 78 may be mounted transversely left of the transverse axis X2 and vertically upward from the longitudinal axis X2. The PCB 78 further includes processor logic 40 which is further described below.

In accordance with one aspect of the present disclosure, the rotatable annular ring 34 is rotatably connected to the generally circular free end 56 of the housing 24 in any suitable manner. The rotatable annular ring 34 is rotatable about the longitudinal axis X1 in a clockwise and counter-clockwise direction. The rotatable annular ring 34 includes an outer surface 80 and an inner surface 82. The inner surface 82 further defines an annular ledge 84 facing towards the front cover 12. The annular ledge 84 is adapted to receive the bezel 42, which is more fully described below, while the inner surface 82 below the annular ledge 84 is adapted to fixedly secure the encoder strip 30, which is also further described below. Thus, as the rotatable annular ring 34 rotates about the longitudinal axis X1, the encoder strip 30 also rotates about the longitudinal axis X1 in the same manner and the same direction as the rotatable annular ring 34. According to one aspect of the present disclosure, the rotatable annular ring 34 circumscribes the first sensor 28, such as an optical encoder 28. Furthermore, inasmuch as the rotatable annular ring 34 is generally the radially outermost element of the night light 10, the rotatable annular ring 34 circumscribes the battery 76, the PCB 78 and the at least one light-emitting diode (i.e., dimmable light source 26). Stated otherwise, the battery 76, the PCB 78 and the at least one LED are positioned within (i.e., interior) the circular area defined by the rotatable annular ring 34.

Further, in one aspect according to the present disclosure, the rotatable annular ring 34 has a diameter of approximately 70 millimeters and a thickness of approximately 1 millimeter, however, the rotatable annular ring 34 may have any other suitable diameter and suitable width as one of ordinary skill in the art would understand. Further, in one aspect according to the present disclosure, the rotatable annular ring 34 may include a tapered edge 86 for a more pleasing appearance and for safety reasons.

In accordance with one aspect of the present disclosure, the bezel 42 is annularly shaped and defines an annular rim 88 and a lower lip 90. The bezel 42 is fixedly attached to housing 24 in any suitable manner and the annular rim 88 is seated on the annular ledge 84 of the rotatable annular ring 34.

In one aspect according to the present disclosure, the outer surface 80 of the rotatable annular ring 34 extends longitudinally toward the front cover 12 approximately 1 millimeter beyond the annular rim 88 of the bezel 42, however, as one of ordinary skill in the art would understand, the outer surface 80 of the rotatable annular ring 34 may be flush with the annular rim 88 or extend longitudinally toward the front cover 12 a greater distance beyond the annular rim 88.

Further, in one aspect according to the present disclosure, the bezel 42 is made of a translucent acrylic/styrene material, although other suitable materials may be used as one of ordinary skill in the art would understand. Since the bezel 42 is translucent, when the night light 10 is powered on and the dimmable light source 26 is illuminated, the bezel 42 has an appearance that is similar to the appearance of a halo. Further, in one aspect according to the present disclosure, the bezel 42 may have a diameter less than approximately 70 millimeters and a thickness of approximately 3 millimeters, however, the bezel 42 may have any other suitable diameter and suitable width as one of ordinary skill in the art would understand. In one aspect according to the present disclosure, the bezel 42 may be mounted transversely left of the transverse axis X2 and vertically upward from the longitudinal axis X2.

The night light 10 further includes a generally circular housing cover 92 which is interior of the front cover 12 of night light 10. The generally circular housing cover 92 defines at least one aperture 94 and at least one clip-receiving aperture 96. The generally circular housing cover 92 is fixedly attached to the housing 24 utilizing any suitable method of attachment. For example, and not meant to be limiting, the generally circular housing cover 92 may be attached to the housing 24 with fastening devices such as screws or the like. Further, the generally circular housing cover 92 may be seated on the lower lip 90 of the bezel 42.

The front cover 12 further defines at least one clip 100. The front cover 12 is fixedly attached to the housing 24 by inserting the at least one clip 100 into the at least one clip-receiving aperture 96 of the generally circular housing cover 92. In one aspect according to the present disclosure, the front cover 12 is a Fresnel lens (i.e. a lens having a stepped or grooved surface). The front cover includes a generally convex outer surface 102 and a generally concave inner surface 104. The front cover 12 is adapted to fit within a diameter of the bezel 42. Further, in one aspect according to the present disclosure, the front cover may have a diameter of approximately 62 millimeters; however, the front cover 12 may have any other suitable diameter length. Further, in one aspect according to the present disclosure, when the night light 10 is plugged into the AC electrical outlet, the frontmost point 52 on the front cover 12 is approximately 38 millimeters away from the wall that supports the AC electrical outlet.

In accordance with one aspect of the present disclosure, the dimmable light source 26 includes a red, green and blue light-emitting diode (RGB LED) which utilizes an additive color model in which red, green and blue light are added together in various ways to reproduce a broad array of colors. In order to form a color with the RGB LED, three light beams may be superimposed. Examples of additive color mixing includes adding red to green which yields yellow, adding red to blue which yields magenta, adding green to blue which yields cyan and adding all three primary colors (red, green and blue) together yields white. As one of ordinary skill in the art would understand, other suitable light sources may be used with the night light 10.

In accordance with one aspect of the present disclosure, the PCB 78 includes an optical encoder 28 mounted on the PCB 78. The optical encoder 28 is configured to translate rotary motion into digital outputs or signals. The optical encoder 28 includes an emitter (not shown) and a detector (not shown). More specifically, the optical encoder 28 includes an LED light source (not shown), a detector integrated circuit (IC) including photodiodes (not shown) and a lens (not shown) to focus light beam from the emitter as well as light received by the detector and a daughter circuit board 31 including circuitry necessary for the optical encoder 28.

In one aspect according to the present disclosure, the detector photodiodes sense the presence and absence of light. The rotary motion of the rotatable annular ring 34 is converted to an equivalent light pattern by utilizing an encoder strip 30. The encoder strip 30 includes reflective and non-reflective surfaces. When light hits the reflective surfaces of the encoder strip 30, the light reflects back to the photodetector IC. When light hits the non-reflective surfaces of the encoder strip 30, no light is reflected back to the photodetector IC.

The alternating reflective and non-reflective surfaces correspond to a pattern sent to the photodiodes. Circuitry within the detector utilizes the moving light pattern to produce digital outputs or signals representing the rotation or motion of the encoder strip 30. Thus, the optical encoder 28 is able to represent the rotation of the encoder strip 30. Therefore, as the rotatable annular ring 34 rotates, the encoder strip 30 fixedly attached to the rotatable annular ring 34 also rotates and the direction of rotation can be determined. The processor logic 40 utilizes this information to control the intensity of the dimmable light source 26 as further described below. One exemplary optical encoder that may be used is the AEDR-8300 Reflective Surface Mount Optical Encoder commercially available from Avago Technologies of 1320 Ridder Park Drive San Jose, Calif. 95131, United States. Further, in one aspect according to the present disclosure the optical encoder 28 is circumscribed by the encoder strip 30 and the rotatable annular ring 34.

In accordance with one aspect of the present disclosure, the PCB 78 includes at least one second sensor 32 mounted on the PCB 78 in any suitable manner. For example, the PCB 78 may include a passive infrared sensor (PIR sensor) which is an electronic sensor that measures infrared (IR) light radiating from objects in its field of view. In one aspect according to the present disclosure, the aperture is a PIR sensor that extends from the PCB 78 longitudinally towards the front surface 12 and extends through the at least one aperture 94 of the generally circular housing cover 92 and beyond the generally circular housing cover 92 a distance approximately less than one millimeter, however, other distances may be utilized as one of ordinary skill in the art would understand. As one of ordinary skill in the art would understand, other sensors, such as a photodetector may be included in the night light configured to sense ambient light levels. The processor logic 40 would then be configured to power on and power off the night light 10 based on the ambient light levels detected by the photodetector. Further, more than one sensor may be combined within the night light 10 to provide desired functionalities.

In accordance with one aspect of the present disclosure, the PCB 78 further includes the processor logic 40. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extend beyond merely gathering data, analyzing the information, and displaying the results.

Figure 10:
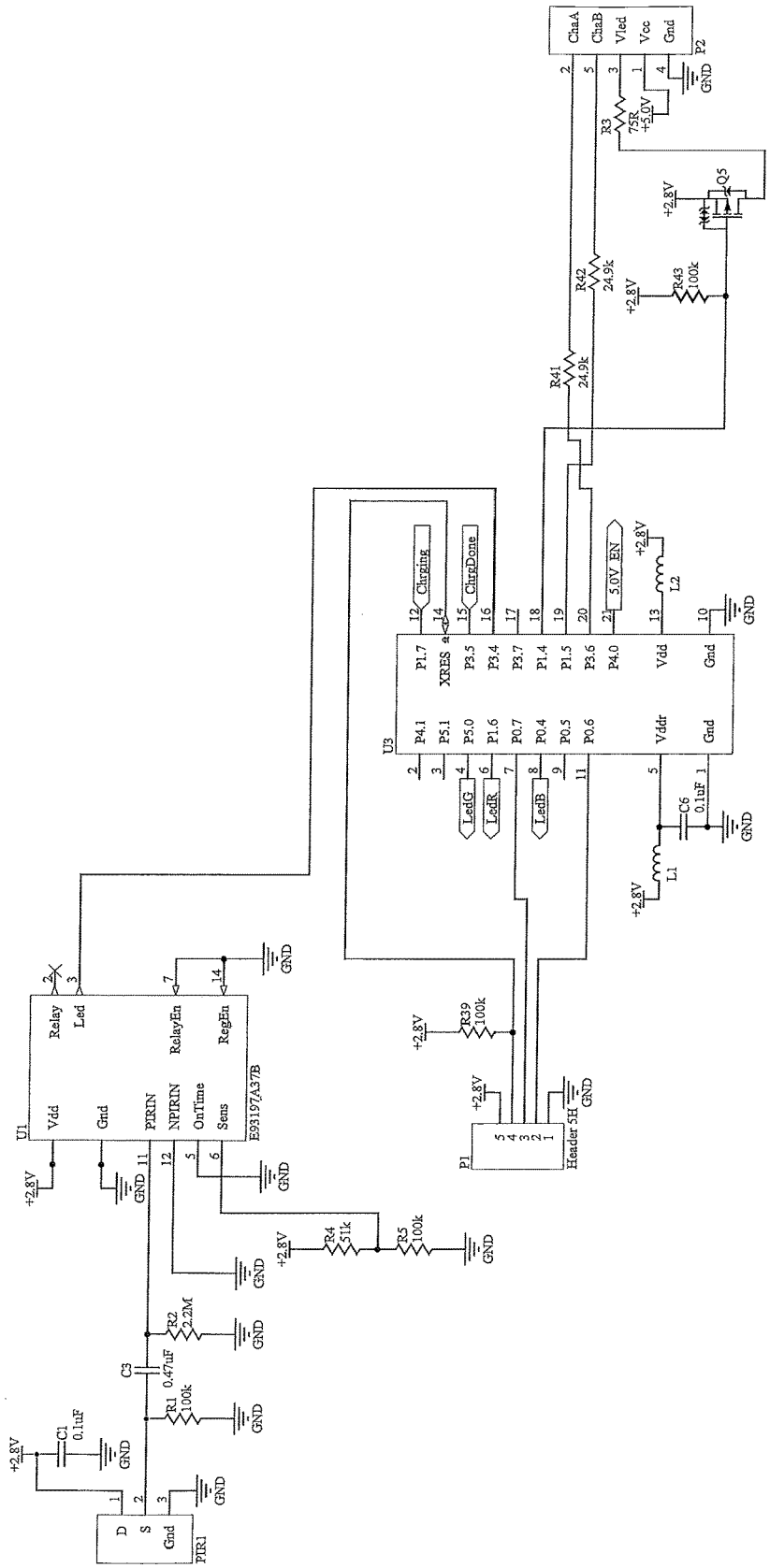
FIG. 10 is an exemplary schematic diagram of the circuitry associated with the processor logic in accordance with the present disclosure.

According to one aspect of the present disclosure, FIG. 10 represents an exemplary schematic diagram of the circuitry associated with the processor logic 40. Further the processor logic 40 of the PCB 78 includes circuitry configured to receive power from the electrical power plug 36 and deliver that power to the dimmable light source 26. The processor logic 40 of the PCB 78 further includes circuitry configured to receive power from the battery source 38 and deliver that power to the dimmable light source 26. Thus, when the night light 10 is plugged into an AC electrical outlet, the processor logic 40 receives power from the AC electrical outlet and delivers that power to the dimmable light source 26. When the night light 10 is removed from the AC electrical outlet, and when the battery source 38 is sufficiently charged, the processor logic 40 receives power from the battery source 38 and delivers that power to the dimmable light source 26.

The processor logic 40 is further configured to power the night light 10 on and off. The night light 10 may be powered on and off through wireless communication or manually by a user as further described below. If the night light 10 is going to be powered on manually, the night light 10 processor logic 40 utilizes the information and data obtained by the optical encoder 28 (i.e. circuitry within the detector utilizes the moving light pattern to produce digital outputs representing the rotation of the encoder strip 30 allowing the optical encoder 28 to represent the rotation of the encoder strip 30) to control the dimmable light source 26. Further, in accordance with the present disclosure, the night light 10 may be controlled wirelessly as further described in FIG. 11 and below.

The processor logic 40 utilizes the information and data related to the motion of the encoder strip 30 and acts in a similar manner to a rheostat in that the processor logic 40 varies the amount of current flowing in the circuitry powering the dimmable light source 26. As the rotatable annular ring 34 rotates in a clockwise direction, the amount of resistance decreases and the amount of current increases. Once the current reaches a minimum level necessary to illuminate the dimmable light source 26, the dimmable light source 26 is illuminated. As the rotatable annular ring 34 continues to rotate in the clockwise direction, the resistance continues to decrease thus increasing the current and increasing the intensity of the light of the dimmable light source 26 up to a maximum allowable current. The maximum allowable current will not allow the current to increase even if the rotatable annular ring 34 continues to be rotated in the clockwise direction. The minimum current level and the maximum current level may be any suitable levels as one of ordinary skill in the art would understand.

Once the maximum current level is reached, the rotatable annular ring 34 may continue to be rotated in the counterclockwise direction. As the rotatable annular ring 34 is rotated in the counterclockwise direction, the resistance increases which decreases the current flowing to the dimmable light source 26 and thus reducing the light intensity of the dimmable light source 26. As the rotatable annular ring 34 continues to rotate in the counterclockwise direction, the resistance continues to increase thus decreasing the current and decreasing the light intensity of the dimmable light source 26 until the current reaches a level below the minimum current necessary to power on the dimmable light source 26.

The processor logic 40 further includes circuitry configured to control the color of the dimmable light source 26 as further described below. According to one aspect of the present invention, the processor logic 40 is configured to control the RGB LED as further described below. The RGB LED of the present disclosure is capable of outputting over sixteen million colors. In other words, the RGB LED is capable of outputting over sixteen million discrete combinations of red, green and blue based on different hue, saturation and lightness shades.

The processor logic 40 further includes circuitry configured to program and/or control the timing of when the night light 10 is powered on and off as further described below.

The processor logic 40 is further configured to allow the night light 10 to communicate with wireless devices, such as a laptop or a smart phone, based on any suitable wireless data communication protocols, including, but not limited to, Bluetooth, ZigBee, WiFi, infrared, WiMax, LTE, ZWave, or other protocols not listed as further described below. Further, it is envisioned that the processor logic 40 may be adapted to accommodate changes in current wireless communication standards. Based on the wireless communication, certain functions of the processor logic 40 may be controlled via the wireless device.

In operation, the night light 10 may be operated manually or through wireless communication. When the night light 10 is operated manually, a user manipulates the at least two prongs 66, 68 of the retractable electrical power plug 36 into an extended position. The user then plugs the at least two prongs 66, 68 into an electrical outlet. The electrical outlet provides AC current to the PCB 78 which powers the dimmable light source 26. The dimmable light source 26 is turned on and off and dimmed or brightened by rotating the rotatable annular ring 34 as described above.

Example methods may be better appreciated with reference to flow charts. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described.

Moreover, less than all the illustrated blocks may be required to implement an example methodology. Blocks may be combined or separated into multiple components. Furthermore, additional and/or alternative methodologies can employ additional, not illustrated blocks.

Figure 11:
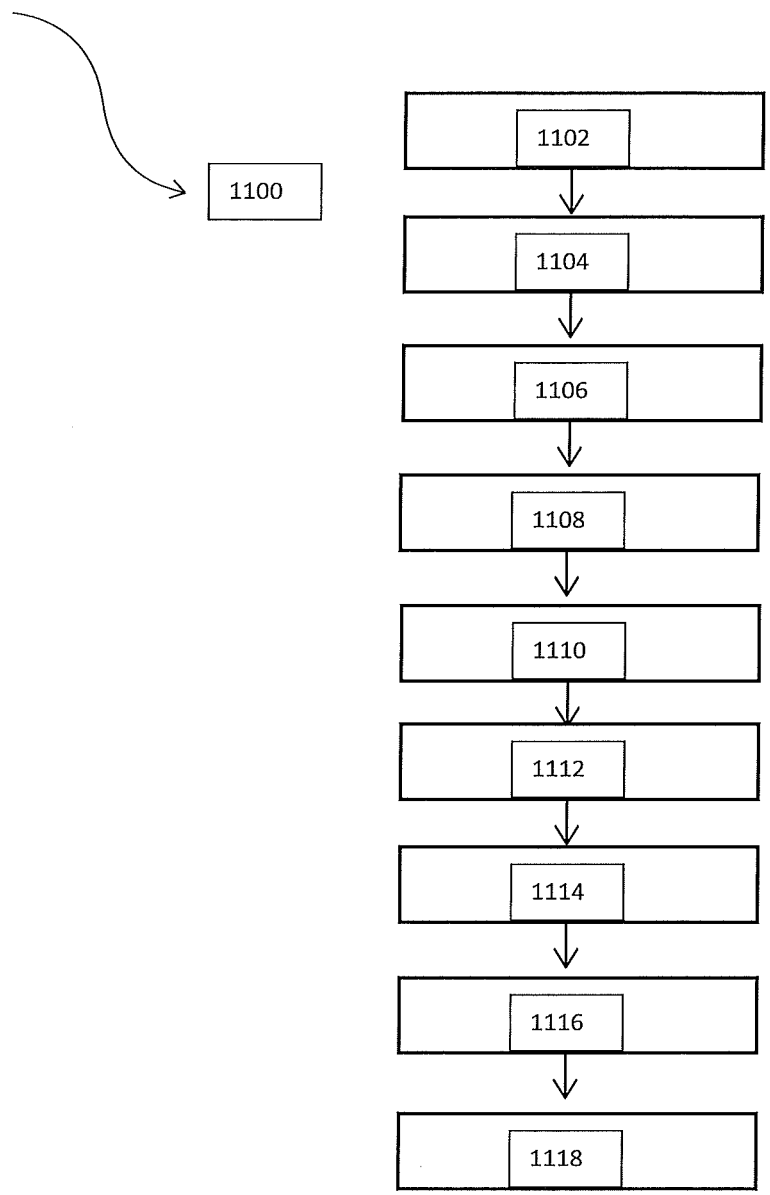
FIG. 11 is a flow chart depicting an exemplary method of wirelessly controlling the night light in accordance with the present disclosure.

FIG. 11 illustrates an example method 1100 of wirelessly controlling the processor logic 40 to control and program the night light 10. For example, and not meant as a limitation, a user may utilize a smart phone and an application to control the processor logic 40. With reference to FIG. 11, a user may download and install an application for the night light 10 onto a smart phone, which is shown generally at 1102. The user then opens the application and a splash screen, which is an introduction page to the application displaying a desired logo, appears while the application is loading, which is shown generally at 1104. After the application has completed the loading step, the user is brought to a main page where the smart phone scans for available wireless devices and provides a list of available wireless devices which includes the night light 10, which is shown generally at 1106.

The user then pairs or links the smart phone to the night light 10 to allow wireless communication between the smart phone and the night light 10, which is shown generally at 1108. Once the night light 10 is properly paired, the screen displays various options selectable by the user, such as a light intensity slider option, a color selection option, a timer option and a motion activation option, which is shown generally at 1110. It is envisioned that other options may be provided within the application as one of ordinary skill in the art would understand.

If the user selects the color selection option, the user can utilize an online RGB color wheel, which is an abstract illustrative organization of color hues around a circle, which shows the relationships between primary colors, secondary colors, tertiary colors etc., to select a desired color of the dimmable light source 26, or the user can choose a color of the dimmable light source 26 based on pre-set options, which is shown generally at 1112.

If the user selects the timer option, the user has the option of utilizing the light intensity slider to dim or brighten the dimmable light source 26, select a new color and set a timer for the night light 10 to power on and/or off at certain times of the day, which is shown generally at 1114. For example, and not meant as a limitation, the timer can be set to automatically turn on at 7:00 PM and automatically turn off at 7:00 AM, or at any other desirable times.

If the user selects the motion activation option, the user has the option of utilizing the light intensity slider to dim or brighten the dimmable light source 26, select a new color, and select an option for the night light 10 to automatically power on for a specific amount of time based on the at least one second sensor 32 detecting movement, which is shown generally at 1116. For example, and not meant as a limitation, the user can set the night light 10 to power on when the at least one second sensor 32 detects movement of an object and stay on for 5 seconds, 10 seconds, 30 seconds, 60 seconds, 5 minutes or indefinitely, which is shown generally at 1118. It is envisioned that the application can be configured to allow different time periods of activation as one of ordinary skill in the art would understand.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

The invention claimed is:

1. A night light comprising:
a housing including a cylindrical sidewall;
a rear surface;
a dimmable light source in operative communication with a rotatable light source controller rotatable about an axis of the housing; wherein the dimmable light source is circumscribed by the rotatable light source controller; and
at least one first sensor mounted within the housing operative to sense rotation of the rotatable light source controller, the at least one first sensor outputting a signal representative of the rotation, wherein the rotatable light source controller is adapted to be rotated by a hand of a user, and wherein the dimmable light source emits a portion of light towards the rear surface and out of the cylindrical sidewall.

2. The night light of claim 1, further comprising:
a printed circuit board positioned interior to the rotatable light source controller; and
a processor logic configured to utilize the output signal of the at least one first sensor to control a current being supplied to the dimmable light source.

3. The night light of claim 2, wherein the printed circuit board and the processor logic are configured to communicate wirelessly.

4. The night light of claim 3, wherein the wireless communication can be used by the user to control at least one of: an intensity of the dimmable light source, a color of the dimmable light source, an illumination timer for the dimmable light source, and a motion activator of the dimmable light source.

5. A night light comprising:
a housing;
a dimmable light source in operative communication with a rotatable light source controller rotatable about an axis of the housing;
at least one first sensor mounted within the housing operative to sense rotation of the rotatable light source controller, the at least one first sensor outputting a signal representative of the rotation, wherein the rotatable light source controller is adapted to be rotated by a hand of a user;
a retractable electrical power plug adapted for electrically connecting to an electrical outlet to provide power to the night light; and
a battery source adapted to be charged while the retractable plug is electrically connected to the electrical outlet and to provide power to the night light when the night light is not electrically connected to the electrical outlet.

6. The night light of claim 5, wherein the battery source is a lithium iron phosphate (LiFePO4) battery (LFP battery).

7. The night light of claim 5, further comprising:
a printed circuit board positioned interior to the rotatable light source controller; and
a processor logic configured to utilize the output signal of the at least one first sensor to control a current being supplied to the dimmable light source.

8. The night light of claim 7, wherein the printed circuit board and the processor logic are configured to communicate wirelessly.

9. The night light of claim 8, wherein the wireless communication can be used by the user to control at least one of: an intensity of the dimmable light source, a color of the dimmable light source, an illumination timer for the dimmable light source, and a motion activator of the dimmable light source.

10. A night light comprising:
a housing;
a dimmable light source including at least one light-emitting diode (LED) in operative communication with a rotatable annular ring having an outer surface and an inner surface rotatable about an axis of the housing;
an encoder strip mounted on the inner surface of the rotatable annular ring;
at least one first sensor mounted within the housing and circumscribed by the rotatable annular ring operative to sense rotation of the rotatable annular ring, the at least one first sensor outputting a signal representative of the rotation, wherein the rotatable annular ring is adapted to be rotated by a hand of a user;
a printed circuit board positioned interior to the rotatable annular ring;
a processor logic configured to utilize the output signal of the at least one first sensor to control a current being supplied to the dimmable light source;
a minimum light intensity level; and
a maximum light intensity level, wherein rotating the rotatable annular ring in a first direction causes the processor logic to supply the current to the dimmable light source to illuminate the dimmable light source in a range from the minimum light intensity level up to the maximum light intensity level, and wherein rotating the rotatable annular ring in a second direction causes the processor logic to decrease the current being supplied to the dimmable light source to dim the dimmable light source in a range from the maximum light intensity level to a zero light intensity level.

11. The night light of claim 10, wherein the first sensor is an optical encoder.

12. The night light of claim 10, wherein the at least one LED is a red, green and blue LED (RGB LED).

13. The night light of claim 10, further comprising:
at least one second sensor different than the at least one first sensor, and the at least one second sensor is circumscribed by the rotatable annular ring.

14. The night light of claim 10, wherein the at least one second sensor is a passive infrared sensor.

15. The night light of claim 10, wherein the printed circuit board and the processor logic are configured to communicate wirelessly.

16. The night light of claim 15, wherein the wireless communication can be used by the user to control at least one of: an intensity of the dimmable light source, a color of the dimmable light source, an illumination timer for the dimmable light source, and a motion activator of the dimmable light source.

17. The night light of claim 10, further comprising:
a translucent bezel mounted on a front of the housing, and wherein the housing is translucent.

18. A night light comprising:
a housing;
a bezel;
a dimmable light source in operative communication with a rotatable light source controller rotatable about an axis of the housing, wherein the dimmable light source is circumscribed by the rotatable light source controller, and wherein the bezel is positioned radially inward from the light source controller; and
at least one first sensor mounted within the housing operative to sense rotation of the rotatable light source controller, the at least one first sensor outputting a signal representative of the rotation, wherein the rotatable light source controller is adapted to be rotated by a hand of a user, and wherein the dimmable light source emits a portion of light through the bezel.

19. The night light of claim 18, further comprising:
a printed circuit board positioned interior to the rotatable light source controller; and
a processor logic configured to utilize the output signal of the at least one first sensor to control a current being supplied to the dimmable light source.

20. The night light of claim 19, wherein the printed circuit board and the processor logic are configured to communicate wirelessly, and wherein the wireless communication can be used by the user to control at least one of: an intensity of the dimmable light source, a color of the dimmable light source, an illumination timer for the dimmable light source, and a motion activator of the dimmable light source.

* * * * *